Dec. 1, 1970   E. P. ANDERSON   3,544,442
APPARATUS FOR PRODUCING AND DISPENSING SODIUM HYPOCHLORITE
Filed May 29, 1968   2 Sheets-Sheet 1

INVENTOR.
EDWARD P. ANDERSON
BY
AGENT

Dec. 1, 1970  E. P. ANDERSON  3,544,442
APPARATUS FOR PRODUCING AND DISPENSING SODIUM HYPOCHLORITE
Filed May 29, 1968  2 Sheets-Sheet 2
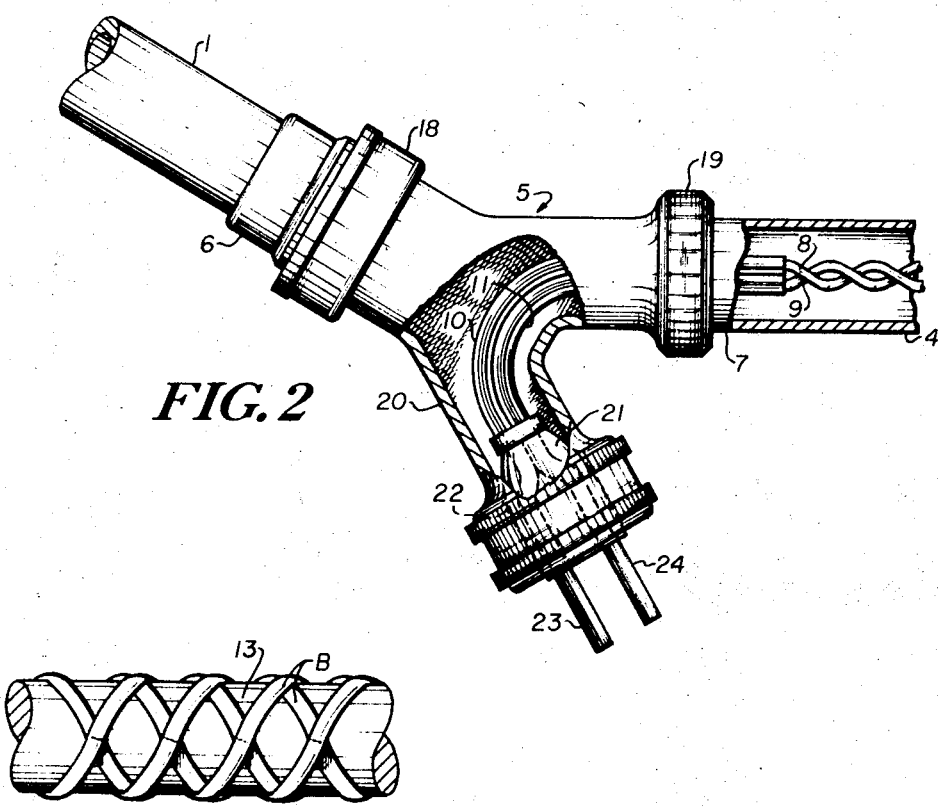
FIG. 2
FIG. 4
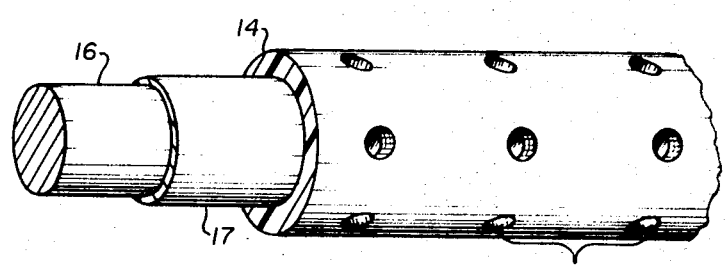
FIG. 5
INVENTOR.
EDWARD P. ANDERSON
BY
AGENT United States Patent Office 3,544,442
Patented Dec. 1, 1970

3,544,442
APPARATUS FOR PRODUCING AND DISPENSING SODIUM HYPOCHLORITE
Edward P. Anderson, Livingston, N.J., assignor to Engelhard Minerals & Chemical Corporation, Newark, N.J., a corporation of Delaware
Filed May 29, 1968, Ser. No. 733,157
Int. Cl. B01k 3/00
U.S. Cl. 204—275                              5 Claims

ABSTRACT OF THE DISCLOSURE

The present invention deals with an apparatus for producing and dispensing sodium hypochlorite comprising conduit means communicable with a source of a liquid sodium chloride electrolyte, an elongated tubular housing, a coupling section interconnecting an end of the tubular housing and an end of the conduit means, a pair of elongated electrodes having adjacent end portions mounted in the coupling section and the electrodes extending into the tubular housing, the electrodes being closely spaced from each other along their lengths, electrical conductor means connected to the electrodes through said coupling section, whereby sodium hypochlorite is generated from the sodium chloride electrolyte passing through the tubular housing in contact with the spaced electrically energized electrodes, and pressure means associated with the conduit means for motivating the electrolyte through the housing and dispensing the electrolyte from the other end of the housing.

BACKGROUND OF THE INVENTION

When a pair of electrodes which are closely spaced from each other and electrically energized while immersed in a sodium chloride electrolyte, the electro-chemical process generates sodium hypochlorite and some free chlorine, oxygen, and hydrogen.

This method has been employed as an anti-fouling means for ship hulls since the generated hypochlorite is toxic to marine organisms, as described in U.S. Pat. No. 3,303,118. Apart from its use as an anti-fouling agent, the sodium hypochlorite is also useful as a sterilizing solution for sanitation measures, for preventing mildew, fungus growth and elimination of certain odors. It is herein proposed to employ the electro-chemical method for producing sodium hypochlorite by means of an apparatus whereby the flowing electrolyte is contained in an elongated housing during the electrolysis of the electrolyte in order to promote a sufficiently toxic concentration of the hypochlorite to render it useful as a stream or spray emerging from the housing ready for application as a sterilizer, sanitizer, etc.

SUMMARY OF THE INVENTION

In accordance with the invention, the apparatus for producing and dispensing sodium hypochlorite comprises an intake conduit means, e.g. a hose, communicable with a source of a liquid sodium chloride electrolyte, e.g. sea water, an elongated tubular housing, which can be an electrically non-conductive member such as a common garden hose of resin or rubber material, as a coupling section interconnecting one end of the intake hose and one end of the tubular housing, a pair of elongated electrodes having end portions mounted in the coupling section and the electrodes extending into the tubular housing preferably substantially coextensive with the length of the tubular housing to provide a substantially large surface, the electrodes being closely spaced from each other along their lengths and preferably electrically insulated from contact with each other, electrical conductor means connected to the electrodes through the coupling section, whereby sodium hypochlorite is generated from the sodium chloride electrolyte passing through the tubular housing in contact wtih the spaced electrically energized electrodes, and pressure means associated with the intake conduit means, e.g. a pump, for motivating the electrolyte through the housing and dispensing the electrolyte from the other end of the housing from a nozzle.

DESCRIPTION OF THE DRAWINGS

FIG. 2 illustrates an enlarged fragmentary view of the apparatus of the invention showing partly in elevation and partly in section, a coupling means according to the invention, FIG. 4 illustrates a fragmentary enlarged view of a sleeved electrode according to the invention, and FIG. 5 illustrates a fragmentary enlarged view of a modified form of a sleeved electrode according to the invention.

DESCRIPTION OF THE PREFERRED EMBODIMENTS

Figure 1:
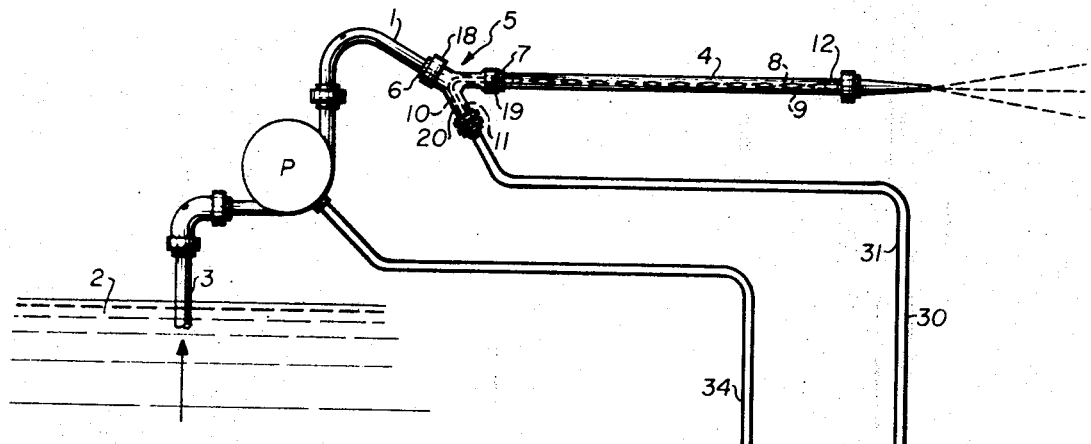
FIG. 1 illustrates a partly elevational and partly schematic view of the apparatus of the invention.

Referring to FIGS. 1 and 2, the apparatus of the invention comprises an intake conduit 1, e.g. a short length of garden hose, communicable with a source of liquid sodium chloride as the electrolyte, e.g. sea water 2, e.g. through intermediate conduit means 3 including a pump P for motivating the electrolyte, an elongated tubular housing 4, such as a length of garden hose composed of a resin material of fabric reinforced rubber, and a coupling section 5 interconnecting one end portion 6 of the intake conduit 1 and one end portion 7 of the tubular housing 4. A pair of elongated electrodes 8 and 9 are located within the housing 4. The electrodes have portions 10 and 11 covered with insulation material and mounted in the coupling section 5 with the electrodes extending from the coupling section into the tubular housing preferably coextensive with the other end portion 12 of the tubular housing thereby providing substantially large electrode surfaces, the electrodes being closely spaced from each other and insulated from each other by means of insulation material therebetween. The insulation material is advantageously in the form of porous sleeves such as a braided sleeve B of an insulating resin material over an electrode 13, e.g. a platinum electrode, as illustrated by FIG. 4, or a sleeve 14 having openings 15 therein over an electrode composed of a core 16 of titanium, tantalum or niobium surfaced with a layer 17 of platinum. In each case, when a pair of electrodes are closely adjacent each other along their lengths or otherwise laid in parallel and twisted one around the other, as illustrated by the electrodes 8 and 9 of FIG. 2, the electrolyte will make electrical contact with each electrode through the porous sleeves, but the braid B of FIG. 4 or the perforated sleeve of FIG. 5 will prevent short circuiting between the electrodes.

The coupling section 5, as illustrated by FIG. 2, comprises an inlet portion 18 connectable to the end portion 6 of the intake conduit 1 and an outlet portion 19 connectable to the end portion 7 of the housing 4. Intermediate of the inlet portion 18 and the outlet portion 19 is a nipple 20 communicating with the interior of the coupling section 5. A plug 21 closes the open end portion 22 of nipple 20 and the end portions 10 and 11 of electrode are connected to electrical conductor means 23 and 24 which pass through the plug 21 and are connectable to a source of electrical current.

Figure 3:
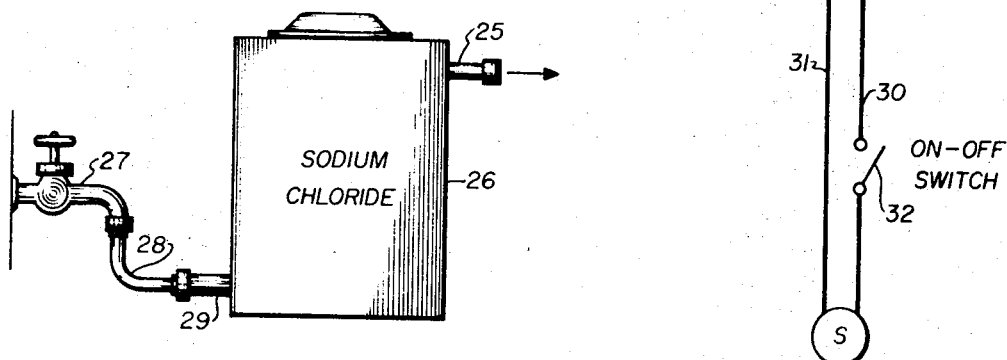
FIG. 3 illustrates an elevational view of a modification of the invention.

While FIG. 1 illustrates the source of liquid sodium chloride as sea water 2 with a motivating pressure means as a pump P, FIG. 3 illustrates a modification whereby the conduit 1 is connectable to outlet pipe 25 of a container 26 containing a sodium chloride salt with the container connected to a tap 27 of pressurized fresh tap water through a tubular connection means 28 connected to an inlet pipe 29 of the container. In this case the fresh water dissolves the salt in the container to provide the required liquid sodium chloride electrolyte.

In order to electrically energize the electrodes 8 and 9 and pump P, electrical leads 30 and 31 are connected to the electrical conductors 23 and 24. The leads 30 and 31 are connected to a source of alternating current S through a rectifier 32 as the D.C. power supply and an on-off switch 32 in series with each other. A second switch 33 is connected in the leads 30 and 31 between the on-off switch and the rectifier.

Leads 34 and 35 are connected between pump P and the switch 33. When the switch 32 is closed, both the electrodes 8 and 9 and pump P are simultaneously electrically energized. When the source of the electrolyte is the sodium chloride container 26, the switch 33 is in the off position whereby only the electrodes are electrically energized since the tap 27 obviously needs no electrical energization.

Various modifications of the invention are contemplated within the scope of the appended claims.

I claim:
1. Apparatus for producing and dispensing sodium hypochlorite, comprising inlet conduit means commuicable with a source of liquid sodium chloride electrolyte, and an elongated, flexible, tubular housing, a coupling section interconnecting an end of the tubular housing and an end of the conduit means, a pair of elongated electrodes having end portions mounted in the coupling section and the electrodes extending into the tubular housing, the electrodes being closely spaced from each other along their lengths by means of insulation means therebetween, electrical conductor means connected to the electrodes through said coupling section, pressure means associated with the conduit means for motivating the electrolyte through the other end of the housing nozzle means at the end of said tubular housing for discharging the effluent in a stream or spray.

2. Apparatus according to claim 1, wherein the pressure means is a pump connected to the inlet conduit.

3. Apparatus according to claim 1, wherein the coupling section comprises a nipple intermediate the connected ends of the coupling section and communicating with the interior of the coupling section, the said end portions of the electrodes being connected to electrical conductor means passing through the nipple.

4. Apparatus according to claim 1, wherein the insulation means is a sleeve of braided material over each electrode, the sleeve having openings therein for exposing the electrode to the electrolyte.

5. Apparatus according to claim 1, wherein the insulation means is a tubular sleeve of resin material over each electrode, the sleeve having openings therein for exposing the electrode to the electrolyte.

References Cited

UNITED STATES PATENTS

| | | | |
|---|---|---|---|
| 447,585 | 3/1891 | Schroeder | 204—275 |
| 535,267 | 3/1895 | Wagner et al. | 204—275 |
| 661,340 | 11/1900 | Grever | 204—275 XR |
| 672,229 | 4/1901 | Lacomme | 204—271 XR |
| 823,671 | 6/1906 | Dieterich | 204—275 XR |
| 844,262 | 2/1907 | Dieterich | 204—275 XR |
| 2,864,750 | 12/1958 | Hughes et al. | 204—149 |
| 3,282,823 | 11/1966 | Richards | 204—272 |
| 3,378,479 | 4/1968 | Colvin et al. | 204—248 |
| 3,479,275 | 11/1969 | Gwynn et al. | 204—275 |
| 3,481,857 | 12/1969 | Gray | 204—272 |

JOHN H. MACK, Primary Examiner

A. C. PRESCOTT, Assistant Examiner

U.S. Cl. X.R.

204—271